United States Patent [19]

Stanfa et al.

[11] Patent Number: 4,628,897
[45] Date of Patent: Dec. 16, 1986

[54] GAS BROILER

[75] Inventors: Peter S. Stanfa, Rochelle; Phillip W. Foster, Lee, both of Ill.

[73] Assignee: Broilway, Inc., Lee, Ill.

[21] Appl. No.: 748,491

[22] Filed: Jun. 25, 1985

[51] Int. Cl.⁴ .............................................. F24C 3/04
[52] U.S. Cl. .................................. 126/41 R; 126/340
[58] Field of Search ............................. 126/41 R, 340

[56] References Cited

U.S. PATENT DOCUMENTS

| | | | |
|---|---|---|---|
| 1,938,470 | 12/1933 | Teller et al. | 126/340 |
| 2,125,989 | 8/1938 | Burch | 126/41 |
| 2,751,486 | 6/1956 | Evans | 126/340 |
| 3,654,912 | 4/1972 | Albright | 126/41 R |
| 3,694,133 | 9/1972 | Wilkerson | 431/286 |
| 4,335,705 | 6/1982 | Kiyomitu | 126/41 R |
| 4,508,097 | 4/1985 | Berg | 126/41 R |

FOREIGN PATENT DOCUMENTS 158765 2/1921 United Kingdom .................. 126/41

Primary Examiner—Carroll B. Dority, Jr.
Attorney, Agent, or Firm—Leydig, Voit & Mayer, Ltd.

[57] ABSTRACT

A gas broiler for outdoor use and having two gas-fired burner tubes located within a cabinet above a broiling rack and below ceramic burner blocks. Food on the rack is broiled by heat radiating downwardly from the burner blocks. The latter are spaced above the burner tubes to reduce the carbon monoxide level in the cabinet, products of combustion being exhausted into an upper hood and then downwardly along the outer side of the cabinet. When the door of the cabinet is opened and closed, the rack is automatically pulled out of and pushed into the cabinet. A drip pan filled with water underlies the rack and catches grease dropping from the rack and the door.

21 Claims, 8 Drawing Figures

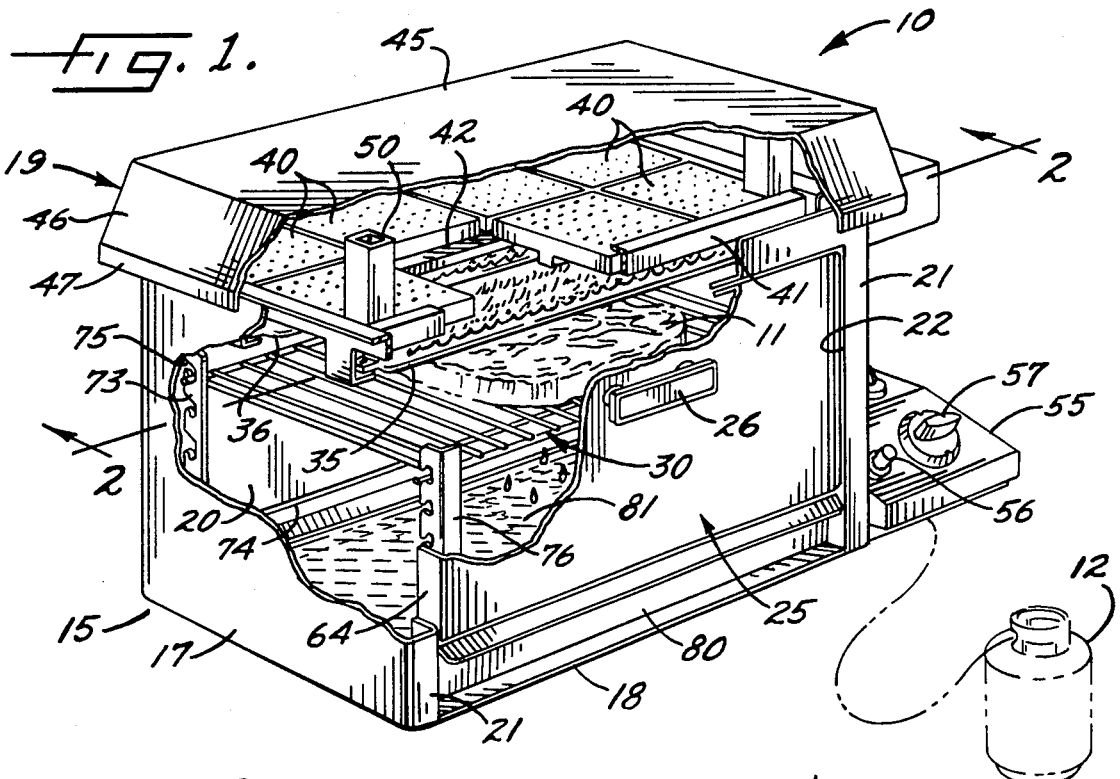
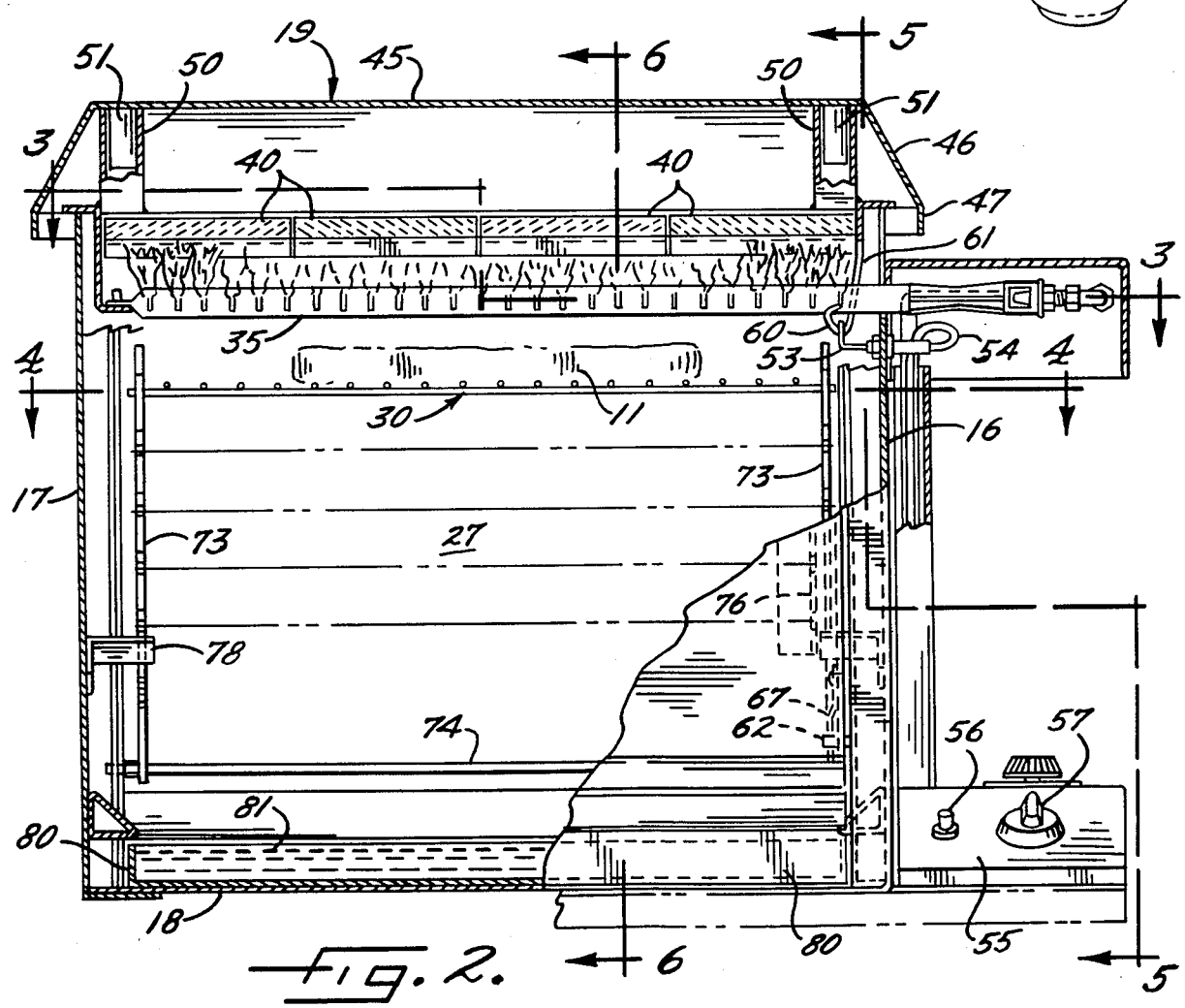

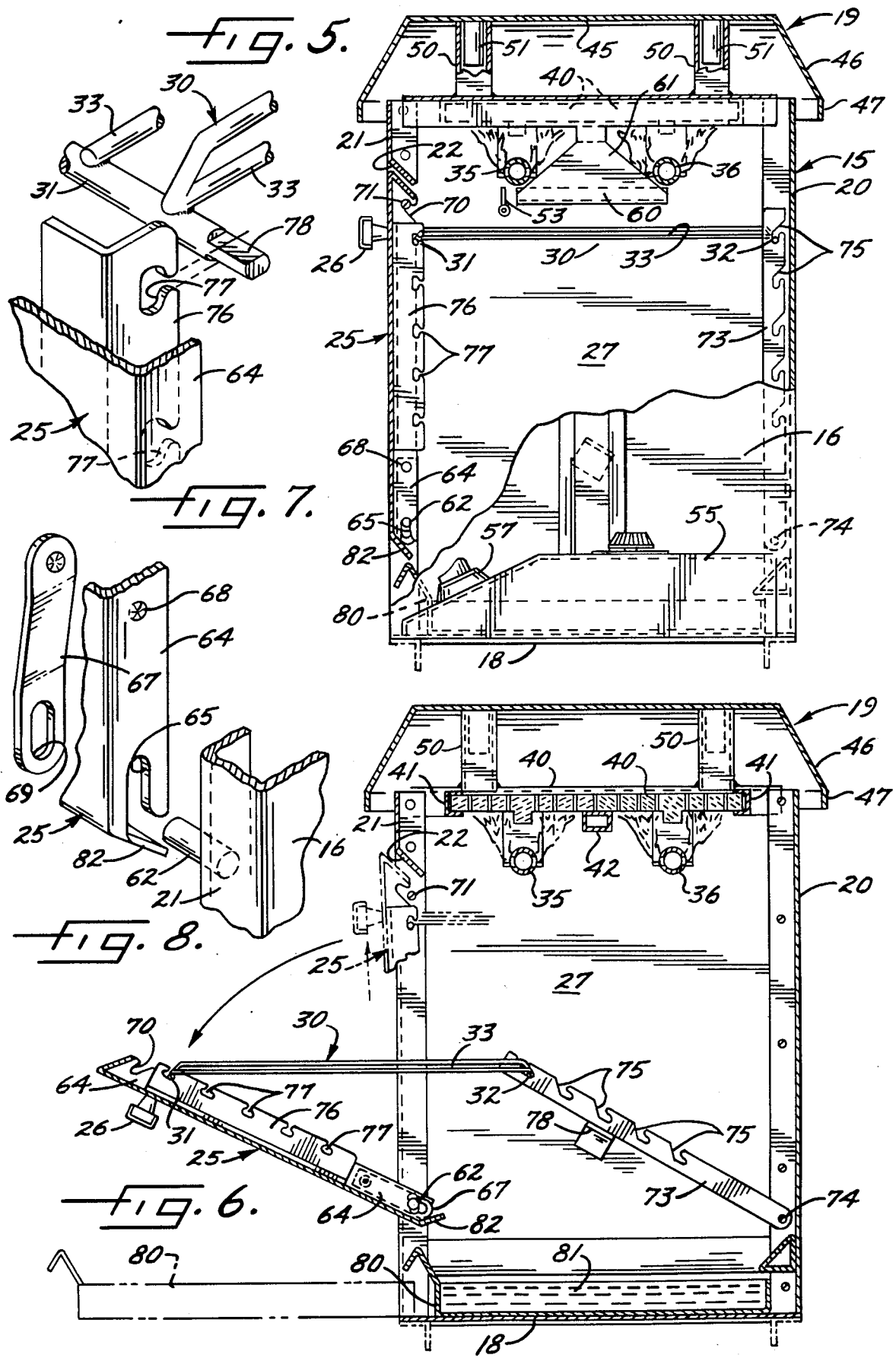

GAS BROILER

BACKGROUND OF THE INVENTION

This invention relates generally to a gas broiler for cooking meat products and the like. The invention more particularly relates to a gas broiler suitable for outdoor patio use and serving as an alternative to conventional charcoal grilles, outdoor gas grilles, etc.

SUMMARY OF THE INVENTION

The general aim of the present invention is to provide a new and improved gas broiler particularly adapted for outdoor use; capable of cooking meat under good control with intense radiant heat and without flare-ups, grease fires or objectionable smoke; and capable of being easily used, adjusted and cleaned.

A more detailed object is to provide a portable gas broiler in which the food product is broiled from above by a gas-fired radiant burner, the burner being surrounded by a novel hood for exhausting products of combustion and comprising ceramic blocks uniquely spaced above gas-fired tubes to reduce the carbon monoxide level in the broiler.

Another object is to provide a gas broiler having a novel height-adjustable rack which is uniquely pulled out of and pushed into the broiler automatically whenever the broiler door is opened and closed.

Still a further object is to provide a door which uniquely coacts with the rack to funnel grease from the rack into an underlying drip pan when the door is open and the rack is pulled out of the broiler.

The invention also resides in the relatively simple construction of the hinge and latch for the door and in the ease with which the door may be removed from the broiler for cleaning.

An additional object of the invention is to provide a gas broiler with unique means for initially and reliably igniting two burner tubes with a single spark ignitor.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved gas broiler incorporating the unique features of the present invention.

FIG. 2 is an enlarged fragmentary cross-section taken substantially along the line 2—2 of FIG. 1.

FIGS. 3, 4, 5 and 6 are fragmentary cross-sections taken substantially along the lines 3—3, 4—4, 5—5 and 6—6, respectively, of FIG. 2.

FIG. 7 is an enlarged exploded perspective view showing certain parts of the door and the rack.

FIG. 8 is an enlarged exploded perspective view showing certain parts of the door and the hinge.

DETAILED DESCRIPTION OF THE PREFERRED EMBODIMENT

Figure 3:
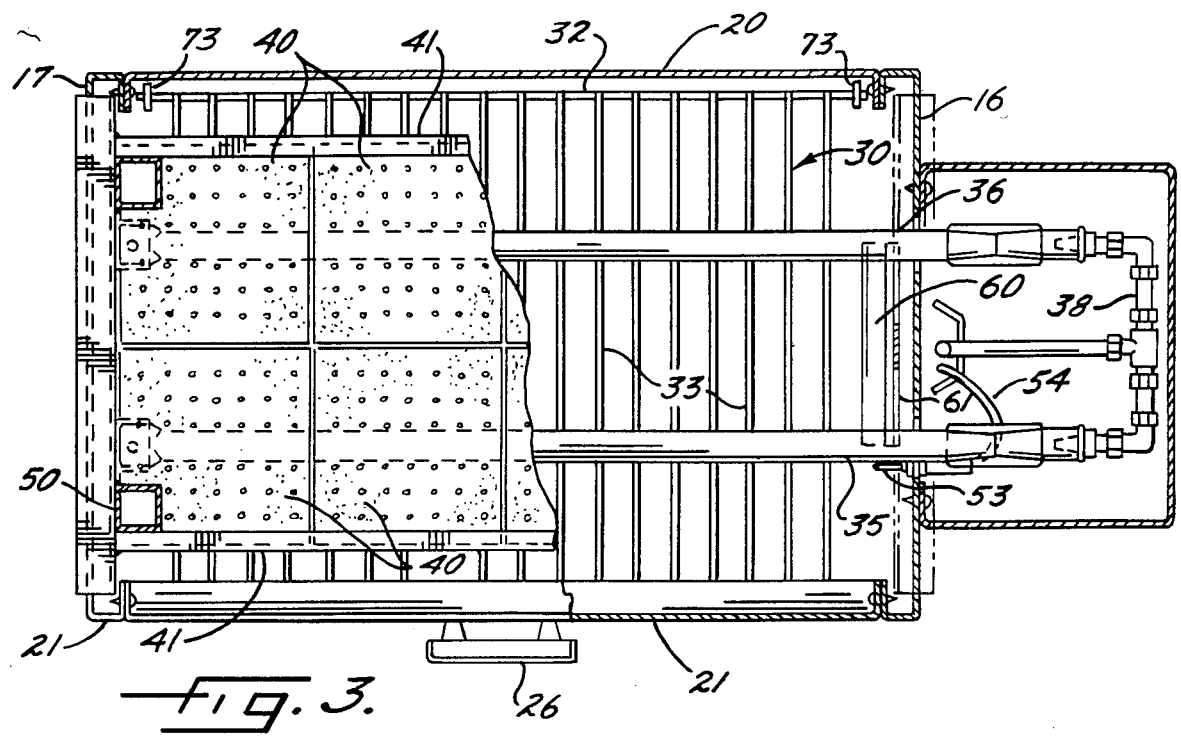

As shown in the drawings for purposes of illustration, the invention is embodied in a gas broiler 10 particularly adapted for outdoor use and adapted to cook steak, ribs, chicken, fish or other food products, a steak 11 being shown in the drawings. The broiler may be supported on a wheeled cart (not shown) and thus is portable. In this particular instance, the broiler is supplied with fuel from a propane tank 12 supported on the cart but it will be appreciated that the broiler could be used in conjunction with methane or other gas.

The present broiler 10 comprises a box-like cabinet 15 of rectangular cross-section and formed by sheet metal walls which preferably are porcelainized for durability and ease of cleaning. Thus, the cabinet includes two opposing side walls 16 and 17, a bottom 18, a top 19, a rear wall 20 and a window-like front wall 21 defining a front access opening 22. Part of the access opening is adapted to be closed by a door 25 which is hinged to swing between open and closed positions with respect to the opening, the door being equipped with a handle 26.

Disposed within the cooking chamber 27 defined within the cabinet 15 is a horizontal rack 30 for supporting the steak 11 or other food product. Herein, the rack is of the wire grid type and includes front and rear horizontally extending wires 31 and 32 (FIG. 4) connected by a series of front-to-rear extending wires 33. The area of the rack is substantially equal to the cross-sectional area of the chamber 27.

Heating of the chamber 27 is effected by two elongated burner tubes 35 and 36 disposed in the same horizontal plane and extending parallel to one another from the side wall 16 to the side wall 17. The burner tubes are adapted to be connected to the propane tank 12 by a piping network 38 (FIG. 3). Each tube includes gas discharge openings along its sides. When gas supplied to the tubes is ignited, upwardly directed flames are produced along the length of each tube (see FIGS. 2 and 5).

To effect broiling of the steak 11, the flames from the tubes 35 and 36 heat overlying burner blocks 40 which herein are made of ceramic material and which radiate intense heat downwardly toward the steak. In the present instance, each burner block is rectangular and is formed with vertically extending holes permitting products of combustion to pass upwardly through the blocks. There are front and rear rows of blocks each containing four blocks, the combined area of the eight blocks being substantially equal to the area of the rack 30.

In accordance with one aspect of the present invention, the burner blocks 40 are spaced vertically from the burner tubes 35 and 36 to facilitate the exhaust of carbon monoxide and other products of combustion from the cooking chamber 27. Moreover, the top 19 of the cabinet 15 is in the form of a unique hood which causes the products of combustion to exhaust downwardly along the outer sides of the cabinet.

More specifically, the burner blocks 40 are supported in vertically spaced relation from the burner tubes 35 and 36 by front and rear bars 41 by a center bar 42 (FIGS. 1, 3 and 6) which extend between the side walls 16 and 17. The front and rear bars 41 are in the form of channels which loosely receive the forward and rear margins of the front and rear blocks, respectively. The center bar 42 is common to both rows of blocks and is flat so as to support the front margins of the rear blocks and the rear margins of the front blocks. The two rows of blocks are spaced slightly from one another to enable the blocks to be removed from the channels 41 for cleaning or replacement.

By virtue of the channels 41 and the bar 42, the bottoms of the burner blocks 40 are spaced above the burner tubes 35 and 36 and are spaced about 1¼ inches above the side openings in the tubes. It has been found that such spacing of the blocks above the tubes enables products of combustion to better pas by and through the blocks so as to reduce the carbon monoxide level in the chamber 27 to a low value well below American Gas Association standards.

The top or hood 19 is made of porcelainized sheet metal and includes a horizontal top wall 45 spaced well above and covering the burner blocks 40. In addition, the hood includes a peripheral skirt 46 which depends from the top wall 45 and which extends downwardly around the upper end portions of the side walls 16 and 17, the rear wall 20 and the front wall 21. The skirt flares outwardly as it progresses downwardly and then terminates in a vertically extending free edge portion 47.

Exhaust gases from the burner blocks 40 rise into the hood 19, strike the top wall 45 thereof and then are deflected to the skirt 46 and downwardly out of the hood along the outer sides of the cabinet 15. This helps avoid a build up of fumes in the cooking chamber 27. Since the steak 11 is cooked from above, fat and juices do not strike any open flame or coals and thus there is virtually no smoke generated and very little air pollution. In addition, there are no flare-ups or grease fires and thus the steak may be broiled under controlled temperature conditions and without heavily charred or burnt spots.

To enable access to the burner tubes 35 and 36 and the burner blocks 40, the hood 19 is removable. For this purpose, four tubular posts 50 (FIG. 2) are secured rigidly to the corners of the cabinet 15 and extend upwardly therefrom. The posts are adapted to telescopically receive four locators or dowels 51 depending from the top wall 45 of the hood 19 adjacent the corners thereof. As a result, the hood may be simply lifted from the cabinet to permit access to the burner tubes 35 and 36 and the burner blocks 40.

In accordance with another feature of the invention, both burner tubes 35 and 36 are initially ignited with a single spark generating electrode 53 (FIG. 2). As shown in FIG. 2, the electrode extends through the side wall 16 of the cabinet 15 and is located adjacent one end of the burner tube 35. A cable 54 connects the electrode to a conventional spark generator (not shown) located within a housing 55 (FIGS. 1 and 2) adjacent the side wall 16 of the cabinet 17. When a button 56 associated with the spark generator is pushed, a spark is generated at the electrode 53 and serves to ignite the gas being discharged from the tube 35 at a rate determined by the position of a gas control knob 57 on the housing 55. To enable the gas from the other tube 36 to be ignited by the single electrode 53, a member 60 (FIGS. 3 and 5) extends transversely between the ends of the two tubes. The member 60 directs gas from the tube 36 to the electrode 52 and the tube 35 to cause such gas to be ignited at substantially the same time as the gas from the tube 35. The member 60 could be in the form of an upwardly opening and generally U-shaped channel or, as shown, is a piece of sheet metal bent upon itself to form a substantially circular tube-like structure extending between the burners. The sheet metal piece includes a mounting bracket portion 61 attached to the cabinet adjacent the side wall 16.

Figure 4:
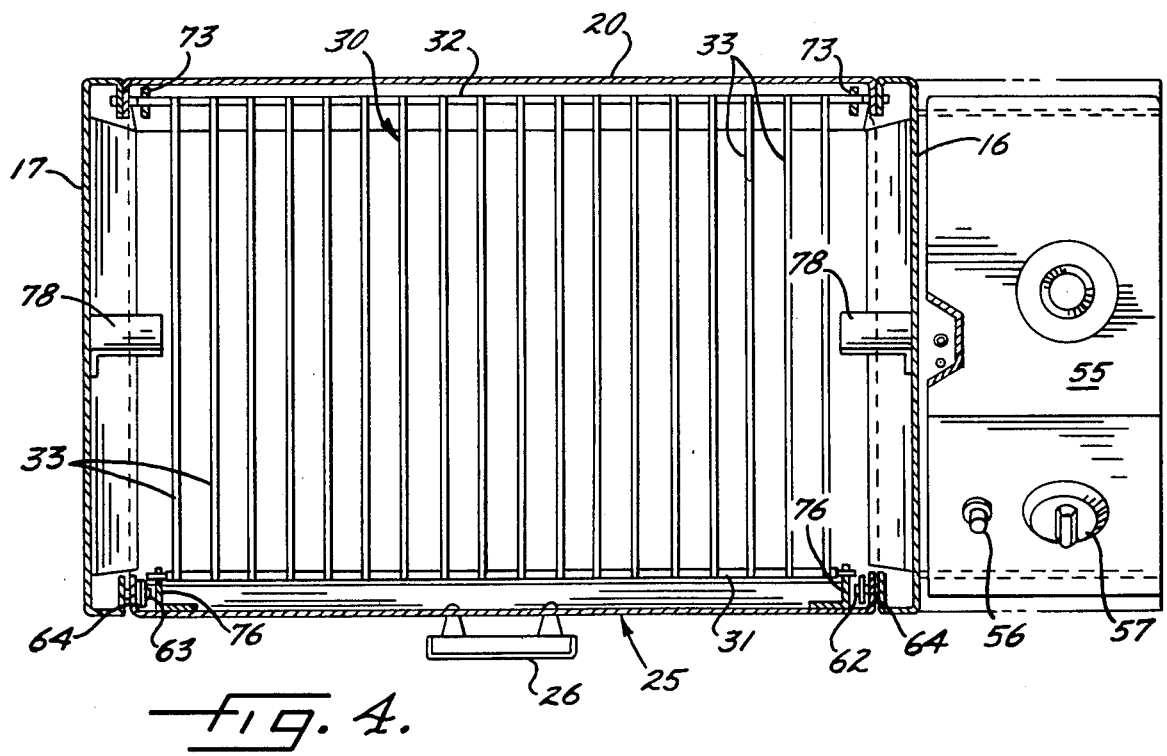

The door 25 is hinged to the cabinet 15 in a simple manner and is adapted to be easily removed for cleaning. As shown in FIGS. 4 and 8, horizontal hinge pins 62 and 63 adjacent the front wall 21 project laterally into the opening 22 adjacent the lower end thereof. The sides of the door include flanges 64 which are formed with downwardly opening slots 65 (FIG. 8) adjacent the lower end of the door. The slots 65 fit pivotally over the hinge pins 62 and 63 and thus the door is supported to swing downwardly and upwardly between closed and open positions.

To detachably captivate the door 25 to the cabinet 15, one side of the door carries a latch 67 (FIG. 8) adapted to releasably engage the pin 62. Herein, the latch is in the form of a vertically extending spring strip whose upper end portion is riveted to the inboard side of one of the door flanges 64 at 68. The lower end portion of the latching strip 67 is formed with a vertically elongated hole 69 alined with the adjacent notch 65 and sized to receive the pin 62. Normally, the cantilevered spring strip 67 is urged to a latched position in which the edges of the hole 69 embrace the pin 62 to hold the door 25 attached to the cabinet 15. By flexing the strip away from the pin 62, the edges of the hole 69 release the pin to enable the door to be lifted upwardly and removed from the cabinet 15 as permitted by the downwardly opening notches 65. An identical latching strip may, if desired, be located at the other side of the door.

Latching of the door 25 in its closed position is effected in a simple manner by downwardly and rearwardly opening notches 70 (FIGS. 5 and 6) in the upper portions of the flanges 64. The notches are adapted to releasably hook around latch pins 71 projecting inwardly into the opening 22 adjacent the upper end thereof. By lifting the door 25 slightly as permitted by the downwardly opening notches 65 and the elongated hole 69, the notches 70 may be released from the latching pins 71 to enable the door to be swung downwardly to its open position. When the door is closed, it fits rather loosely within the opening 22 so as to permit air to freely enter the chamber and support combustion of the gas.

Pursuant to another aspect of the invention, the rack 30 is automatically pulled out of and pushed into the cabinet 15 when the door 25 is opened and closed and, in addition, the rack may be adjusted to different vertical positions to change the distance between the rack and the burner blocks 40. To these ends, two arms 73 (FIGS. 2 and 5) are pivotally connected to the cabinet by a horizontal rod 74 extending between the side walls 16 and 17. The rod is located in the same horizontal plane as the hinge pins 62 and 63 and supports the arms 73 for upward and downward swinging. Five upwardly and rearwardly opening notches 75 (FIGS. 5 and 6) are formed along the rear edge portion of each arm 73 and are adapted to selectively and pivotally receive the rear wire 32 of the rack 30.

Laterally spaced brackets 76 (FIGS. 5, 6 and 7) are attached rigidly to the rear face of the door 25. Each bracket is formed with five notches 77 (FIG. 7) adapted to selectively and pivotally receive the front wire 31 of the rack 30, the ends of such wire being of reduced diameter and being flattened as indicated at 78 in FIG. 7. Each notch 77 opens rearwardly and is generally in the shape of a keyhole.

With the foregoing arrangement, the rack 30 is supported at a selected height by placing the rear wire 32 in a horizontally alined pair of notches 75 in the arms 73 and by placing the front wire 31 in a horizontally alined pair of notches 77 in the brackets 76. When the door 25 is swung open, the rack 30 is pulled forwardly out of the cabinet 15 as shown in FIG. 6 to enable convenient access to the food product. The arms 73 engage stops 78 on the side walls 16 and 17 to limit opening of the door to the position shown in FIG. 6. When the door is closed, the rack is automatically pushed into the cabinet 15. By virtue of the parallelogram arrangement of the pivots 62 and 63, the arms 73, the rod 74 and the brackets 76, the rack remains substantially horizontal as it moves into and out of the cabinet. When the door is open, the rack may be raised from the notches and removed for cleaning or height adjustment.

The broiler 10 is completed by a drip pan 80 (FIG. which fits into the opening 22 beneath the door 25 and which rests on the bottom 18 of the cabinet 15. Grease and drippings from the rack 30 drop into and are collected in the pan 80. To facilitate cleaning of the pan, the latter may be filled with water as indicated at 81 and then wiped dry when the pan is pulled forwardly out of the cabinet as shown in phantom in FIG. 6. The intense heat from the burner blocks 40 converts some of the water into steam to help moisturize and tenderize the meat.

When the door 25 is opened and the rack 30 is pulled forwardly as shown in FIG. 6, grease dropping from the rack falls on and runs down the downwardly and rearwardly inclined rear face of the door and is caught by a lip 82 on the lower end portion of the door. As the door is closed, the grease spills over the lip and into the drip pan 80.

We claim:

1. A gas broiler for cooking meat products and the like, said broiler comprising a box-like cabinet having a top and a bottom, having front and rear walls and having a pair of opposing side walls, an opening in the front wall of said cabinet, a door hinged to said cabinet and adapted to be swung between open and closed positions with respect to said opening, a generally horizontal rack located in said cabinet for supporting meat products, a gas-fired burner tube disposed in said cabinet and extending generally horizontally above said rack, said burner tube being operable when fired to produce an upwardly directed flame along substantially its entire length, ceramic burner blocks, means supporting said burner blocks within said cabinet in upwardly spaced relation from said burner tube, said burner blocks overlying substantially the entire area of said rack and absorbing the heat of said flame to radiate said heat downwardly toward said rack, apertures in said burner blocks and permitting products of combustion from said burner tube to pass upwardly through said burner blocks, said top being defined by a hood having a generally horizontal top wall overlying said burner blocks and having a peripheral skirt depending from said top wall, posts within said cabinet and supporting said top wall in upwardly spaced relation from said burner blocks whereby said top wall coacts with said burner blocks to define a chamber for products of combustion passing upwardly through the apertures in said burner blocks, said skirt having front and rear panels and opposing side panels extending downwardly around the upper end portions of said front, rear and side walls, respectively, in outwardly spaced relation therefrom to exhaust products of combustion out of said chamber and downwardly along the outer sides of said front, rear and side walls.

2. A gas broiler as defined in claim 1 in which said supporting means comprise horizontally spaced bars spaced above said burner tube and extending horizontally between a pair of opposing walls.

3. A gas broiler as defined in claim 2 in which said bars extend horizontally between said opposing side walls, said burner tube being elongated and extending horizontally from one of said side walls toward the other of said side walls.

4. A gas broiler as defined in claim 2 in which said posts project upwardly from said bars, and locators projecting downwardly from the top wall of said hood and telescoped slidably with said posts whereby said posts and locators coact to support said hood for upward removal away from said burner blocks.

5. A gas broiler as defined in claim 1 in which said burner tube is elongated and extends horizontally between a pair of opposing walls, a second elongated gas-fired burner tube disposed in said cabinet in substantially the same horizontal plane as said first tube and extending substantially parallel to said first tube, a spark electrode adjacent one end portion of one of said tubes for initially igniting the gas discharged from such tube, and a member located in said cabinet and extending transversely beneath said tubes from said one end portion of said one tube to the adjacent end portion of said other tube to direct gas discharged from said other tube to said electrode and enable initial ignition of such gas.

6. A gas broiler as defined in claim 1 further including hinge means adjacent the lower end portion of said door and mounting said door for downward and upward swinging about a predetermined axis between said closed and open positions, means located on and swingable with the rear face of said door and pivotally connected to the front of said rack, arm means pivotally mounted adjacent said rear wall to swing forwardly and rearwardly about an axis extending substantially parallel to and disposed substantially in the same horizontal plane as said predetermined axis, and means pivotally connecting the rear of said rack to said arm means whereby said rack moves forwardly out of and rearwardly into said cabinet when said door is swung to said open and closed positions, respectively, and remains substantially horizontal during such movement.

7. A gas broiler as defined in claim 1 further including hinge means adjacent the lower end portion of said door and mounting said door for downward and upward swinging between said open and closed positions, said hinge means comprising a pair of pins adjacent said side walls and projecting horizontally into said opening, a pair of downwardly opening slots formed in opposite edges of said door adjacent the lower end thereof and pivotally receiving said pins, and a latch on said door and normally engaging one of said pins to captivate said pins in said slots, said latch being movable relative to said door to an unlatched position releasing said one pin and permitting removal of said door from said cabinet.

8. A gas broiler as defined in claim 1 further including a drip pan adapted to hold liquid and mounted adjacent the bottom of said cabinet to slide rearwardly into and forwardly out of said cabinet through said opening, said drip pan being located below said door.

9. A gas broiler for cooking meat products and the like, said broiler comprising a box-like cabinet having a top and a bottom, having front and rear walls and having a pair of opposing side walls, a generally horizontal rack located in said cabinet for supporting meat products, a gas fired burner tube disposed in said cabinet and extending generally horizontally above said rack, said burner tube being operable when fired to produce an upwardly directed flame along substantially its entire length, ceramic burner blocks overlying said burner tube and overlying substantially the entire area of said rack to absorb the heat of said flame and to radiate said heat downwardly toward said rack, an opening in the front wall of said cabinet, a door, hinge means adjacent the lower end portion of said door and mounting said door on said cabinet for downward and upward swinging about a horizontal pivot axis between closed and open positions with respect to said opening, bracket means attached rigidly to and swingable with the rear face of said door and pivotally but releasably connected to the front of said rack, arm means pivotally mounted adjacent said rear wall to swing forwardly and rearwardly about a horizontal axis extending parallel to and disposed substantially in the same horizontal plane as said pivot axis, means pivotally but releasably connecting the rear of said rack to said arm means whereby said rack moves forwardly out of and rearwardly into said cabinet when said door is swung to said open and closed positions, respectively, and remains substantially horizontal during such movement, and stop means for preventing said door from swinging downwardly beyond a predetermined fully open position, said door, when in said fully open position, underlying all portions of said rack located outside of said cabinet so as to catch drippings from said rack.

10. A gas broiler as defined in claim 10 in which said rack comprises a wire grid having front and rear wires extending parallel to said pivot axis, said bracket means comprising a pair of laterally spaced brackets secured to the rear face of said door and extending substantially vertically when said door is in said closed position, said arm means comprising a pair of laterally spaced arms which extend substantially vertically when said door is in said closed position, laterally spaced notches formed in said brackets and releasably receiving the front wire of said rack, and laterally spaced notches formed in said arms and releasably receiving the rear wire of said rack.

11. As gas broiler as defined in claim 9 further including a drip pan adapted to hold liquid and mounted adjacent the bottom of said cabinet to slide rearwardly into and forwardly out of said cabinet through said opening, said drip pan being located below said door.

12. A gas broiler as defined in claim 9 in which said hinge means comprise a pair of pins adjacent said side walls and projecting horizontally into said opening, a pair of downwardly opening slots formed in opposite edges of said door adjacent the lower end thereof and pivotally receiving said pins, and a latch on said door and normally engaging one of said pins to captivate said pins in said slots, said latch being movable relative to said door to an unlatched position releasing said one pin and permitting removal of said door from said cabinet.

13. A gas broiler for cooking meat products and the like, said broiler comprising a box-like cabinet having a top and a bottom, having front and rear walls and having a pair of opposing side walls, an opening in the front wall of said cabinet, a door hinged to said cabinet and adapted to be swung between open and closed positions with respect to said opening, a generally horizontal rack located in said cabinet for supporting meat products, a gas-fired burner tube disposed in said cabinet and extending generally horizontally above said rack, said burner tube being operable when fired to produce an upwardly directed flame along substantially its entire length, ceramic burner blocks, means supporting said burner blocks within said cabinet in upwardly spaced relation from said burner tube, said burner blocks overlying substantially the entire area of said rack and absorbing the heat of said flame to radiate said heat downwardly toward said rack, said top being defined by a hood having a generally horizontal top wall spaced upwardly from and overlying said burner blocks and having a peripheral skirt depending from said top wall and extending downwardly around the upper end portions of said front, rear and side walls in outwardly spaced relation therefrom to exhaust products of combustion out of said cabinet and downwardly along the outer sides of said front, rear and side walls, said supporting means for said burner blocks comprising horizontally spaced bars spaced above said burner tube and extending horizontally between a pair of opposing walls, post projecting upwardly from said bars, and locators projecting downwardly from the top wall of said hood and telescoped slidably with said posts whereby said posts and locators coact to support said hood for upward removal away from said burner blocks.

14. A gas broiler for cooking meat products and the like, said broiler comprising a box-like cabinet having a top and bottom, having front and rear walls and having a pair of opposing side walls, an opening in the front wall of said cabinet, a door hinged to said cabinet and adapted to be swung between open and closed positions with respect to said opening, hinge means adjacent the lower end portion of said door and mounting said door for downward and upward swinging between said open and closed positions, said hinge means comprising a pair of pins adjacent said side walls and projecting horizontally into said opening, a pair of downwardly opening slots formed in opposite edges of said door adjacent the lower end thereof and pivotally receiving said pins, and a latch on said door and normally engaging one of said pins to captivate said pins in said slots, said latch being movable relative to said door to an unlatched position releasing said one pin and permitting removal of said door from said cabinet, a generally horizontal rack located in said cabinet for supporting meat products, a gas-fired burner tube disposed in said cabinet and extending generally horizontally above said rack, said burner tube being operable when fired to produce an upwardly directed flame along substantially its entire length, ceramic burner blocks, means supporting said burner blocks within said cabinet in upwardly spaced relation from said burner tube, said burner blocks overlying substantially the entire area of said rack and absorbing the heat of said flame to radiate said heat downwardly toward said rack, and said top being defined by a hood having a generally horizontal top wall spaced upwardly from and overlying said burner blocks and having a peripheral skirt depending from said top wall and extending downwardly around the upper end portions of said front, rear and side walls in outwardly spaced relation therefrom to exhaust products of combustion out of said cabinet and downwardly along the outer sides of said front, rear and side walls.

15. A gas broiler as defined in claim 14 in which said latch comprises a resiliently yieldable strip having one end portion connected to said door to permit the free end portion of said strip to swing between latched and unlatched positions, and a hole in the free end portion of said strip and receiving said one pin when said strip is in said latched position so as to captivate said pins in said slots.

16. A gas broiler for cooking meat products and the like, said broiler comprising a box-like cabinet having a top and a bottom, having front and rear walls and having a pair of opposing side walls, a generally horizontal rack located in said cabinet for supporting meat products, a gas fired burner tube disposed in said cabinet and extending generally horizontally above said rack, said burner tube being operable when fired to product an upwardly directed flame along substantially its entire length, ceramic burner blocks overlying said burner tube and overlying substantially the entire area of said rack to absorb the heat of said flame and to radiate said heat downwardly toward said rack, an opening in the front wall of said of said cabinet, a door, hinge means adjacent the lower end portion of said door and mounting said door on said cabinet for downward and upward swinging about a horizontal pivot axis between closed and open positions with respect to said opening, bracket means located on said swingable with the rear face of said door and pivotally connected to the front of said rack, arm means pivotally mounted adajcent said rear wall to swing forwardly and rearwardly about a horizontal axis extending parallel to and disposed substantially in the same horizontal plane as said pivot axis, means pivotally connecting the rear of said rack to said arm means whereby said rack moves forwardly out of and rearwardly into said cabinet when said door is swung to said open and closed positions, respectively, and remains substantially horizontal during such movement, said rack comprising a wire grid having front and rear wires extending parallel to said pivot axis, said bracket means comprising a pair of laterally spaced brackets secured to the rear face of said door and extending substantially vertically when said door is in said closed position, said arm means comprising a pair of laterally spaced arms which extend substantially vertically when said door is in said closed position, laterally spaced notches formed in said brackets and releasably receiving the front wire of said rack, and laterally spaced notches formed in said arms and releasably receiving the rear wire of said rack.

17. A gas broiler as defined in claim 16 in which each bracket and each arm is formed with a row of vertically spaced notches to enable adjustment of the vertical position of said rack within said cabinet.

18. A gas broiler as defined in claim 16 in which the notches in said brackets open out of the rear sides of said brackets.

19. A gas broiler as defined in claim 18 in which the notches in said arm open out of the rear side of said arms.

20. A gas broiler for cooking meat products and the like, said broiler comprising a box-like cabinet having a top and a bottom, having front and rear walls and having a pair of opposing side walls, a generally horizontal rack located in said cabinet for supporting meat products, a gas fired burned tube disposed in said cabinet and extending generally horizontally above said rack, said burner tube being operable when fired to produce an upwardly directed flame along substantially its entire length, ceramic burner blocks overlying said burner tube and overlying substantially the entire area of said rack to absorb the heat of said flame and to radiate said heat downwardly toward said rack, an opening in the front wall of said cabinet, a door, hinge means adjacent the lower end portion of said door and mounting said door on said cabinet for downward and upward swinging about a horizontal pivot axis between closed and open positions with respect to said opening, said hinge means comprising a pair of pins adjacent said side walls and projecting horizontally into said opening, a pair of downwardly opening slots formed in opposite edges of said door adjacent the lower end thereof and pivotally receiving said pins, a latch on said door and normally engaging one of said pins to captivate said pins in said slots, said latch being movable relative to said door to an unlatched position releasing said one pin and permitting removal of said door from said cabinet, bracket means located on and swingable with the rear face of said door and pivotally connected to the front of said rack, arm means pivotally mounted adjacent said rear wall to swing forwardly and rearwardly about a horizontal axis extending parallel to and disposed substantially in the same horizontal plane as said pivot axis, and means pivotally connecting the rear of said rack to said arm means whereby said rack moves forwardly out of and rearwardly into said cabinet when said door is swung to said open and closed positions, respectively, and remains substantially horizontal during such movement.

21. A gas broiler as defined in claim 20 in which said latch comprises a resiliently yieldable strip having one end portion connected to said door to permit the free end portion of said strip to swing between latched and unlatched positions, and a hole in the free end portion of said strip and receiving said one pin when said strip is in said latched position so as to captivate said pins in said slots.

* * * * *